(12) United States Patent
Nania (10) Patent No.: US 6,666,495 B2
(45) Date of Patent: Dec. 23, 2003

(54) RETRACTABLE TOP SYSTEM FOR VEHICLES WITH MOVABLE REAR SECTION

(75) Inventor: Adrian Nania, Rochester, MI (US)

(73) Assignee: Edscha Roof Systems Inc., Southfield, MI (US)

(*) Notice: Subject to any disclaimer, the term of this patent is extended or adjusted under 35 U.S.C. 154(b) by 0 days.

(21) Appl. No.: 09/952,133

(22) Filed: Sep. 13, 2001

(65) Prior Publication Data

US 2003/0047961 A1 Mar. 13, 2003

(51) Int. Cl.[7] ................................................. B60J 7/00
(52) U.S. Cl. .............. 296/107.08; 296/108; 296/136.03
(58) Field of Search .................. 296/107.08, 107.17, 296/107.16, 107.18, 108, 109, 114, 116, 136.03, 76, 107.09

(56) References Cited

U.S. PATENT DOCUMENTS

| | | | |
|---|---|---|---|
| 5,769,483 A | * | 6/1998 | Danzl et al. ............ 296/107.08 |
| 5,979,970 A | * | 11/1999 | Rothe et al. ............ 296/107.17 |
| 6,053,560 A | * | 4/2000 | Rothe ..................... 296/107.16 |
| 6,425,622 B2 | * | 7/2002 | Eberle .................... 296/107.16 |
| 6,508,502 B2 | * | 1/2003 | Willard .................. 296/107.07 |

FOREIGN PATENT DOCUMENTS

| | | |
|---|---|---|
| DE | 19642154 | 4/1998 |
| DE | 19962070 | 7/2001 |
| EP | 0835779 | 4/1998 |
| EP | 0936095 | 12/1998 |

OTHER PUBLICATIONS

U.S. Ser. No. 09/746,743 filed Dec. 22, 2000 : Copy of application text as filed on Dec. 22, 2000 (24 pages).

* cited by examiner

Primary Examiner—Stephen T. Gordon
Assistant Examiner—Lori L Coletta
(74) Attorney, Agent, or Firm—Davidson, Davidson & Kappel, LLC (57) ABSTRACT

A vehicle convertible system includes a roof section having a plurality of retractable panel and a movable rear section separate from the roof section defining part of a storage area for the retractable panels. The rear section includes a first rear panel and a second rear panel, with the second rear panel may include a window. A convertible system for SUVs (sports utility vehicles) and minivans is thus possible.

24 Claims, 8 Drawing Sheets

RETRACTABLE TOP SYSTEM FOR VEHICLES WITH MOVABLE REAR SECTION

BACKGROUND OF THE INVENTION

The present invention relates generally to convertibles, and more particularly to a convertible with a retractable top system.

Convertible vehicle tops made of one or more rigid parts are known. Collapsible tops of this type are constructed typically in the form of two parts or shells, and are generally provided on two-seat automobiles. The shells are generally small, since the size of the roof space to be covered by the convertible top is small because of the relatively small passenger cabin. The shells thus can be easily stored behind the passenger seats.

Convertible tops however also are being provided for conventional four-seat vehicles or SUVs. These typically have three parts, one part including the rear window. Because of the larger roof size, a large trunk area behind the rear seat is provided for storage of the collapsible tops. However, the requisite large trunk area is disadvantageous, and some vehicles, such as SUVs, hatchbacks and station wagons, do not have trunk areas at all.

German Patent Application No. DE 196 42 154 A1 describes a motor vehicle having a retractable roof which is subdivided into front, middle and rear subpieces. The front subpiece can be folded in the direction opposite the middle subpiece, while the middle subpiece may be shifted in the same direction as the rear subpiece. The driving device of the retractable roof comprises a main bearing having two links which are secured pivotably to the main bearing, one of the links being configured such that it can be driven about its pivot axis.

European Patent Application Nos. 0 936 095 and 0 835 779 disclose retractable hard tops in vehicles with trunks. A second piece can move to open or close a storage area. The retractable hard tops are not suitable for minivans or SUVs.

SUMMARY OF THE INVENTION

In response to the need for convertible tops for larger passenger cabins, the assignee of the present invention through related companies, has developed a three-piece convertible top disclosed in U.S. Ser. No. 09/746,743 filed Dec. 22, 2000 entitled CONVERTIBLE TOP AND DRIVING DEVICE FOR A CONVERTIBLE TOP, the entire contents of which are hereby incorporated by reference herein. However, a trunk area for storage is required with this convertible top.

An object of the present invention is to provide for convertible top storage in vehicles that do not have a trunk area.

An alternate or additional object of the present invention is to provide for reduced storage requirements for a convertible top.

The present invention provides a vehicle convertible system comprising a roof section having a plurality of retractable panels and a movable rear section separate from the roof section defining part of a storage area for the retractable panels. The rear section includes a first rear panel and a second rear panel, with the second rear panel including a window.

By having a separate movable rear section that can incorporate the rear window of the automobile, the convertible system can permit the roof section to be easily stored. The rear section can be moved to permit easy access to the storage area, so that the retractable panels of the roof section can be placed therein. Convertible systems for vehicle without trunk areas, such as minivans, SUVs, station wagons, and the like are possible.

Preferably, the rear section is pivotable about a first rotational axis. The rear section thus may be pivoted rearwardly to provide increased access to the storage area.

The second rear panel also preferably is movable with respect to the first rear panel, and can cover the retractable panels when the retractable panels are in the storage area. Thus the rear window can function as a cover for the retracted roof panels. Preferably, the second rear panel pivots with respect to the first rear panel about a second rotational axis.

The roof section advantageously may have three panels, and may retract similarly to the three-panel construction disclosed in incorporated-by-reference U.S. patent application Ser. No. 09/746,743. The front roof panel thus may move on top of the middle roof panel, which together may rotate with respect to the rear roof panel to form a stack. Concurrently, all three roof panels may rotate about a main mounting bracket into the storage area. The linkages and drive for the roof section may be similar to that in the U.S. Ser. No. 09/746,743 application.

The rear and roof section may be driven automatically, for example by electronic motors, pneumatically or hydraulically. A manual override for the rear and the roof section is possible.

The present invention also provides a vehicle convertible system comprising a roof section having a plurality of retractable panels and a movable rear section separate from the roof section defining part of a storage area for the retractable panels. The rear section includes a first rear panel and a second rear panel, with the second rear panel being pivotable with respect to the first rear panel. This permits the second rear panel, which can include a window, to fold down over the storage area.

The present invention also provides a convertible vertical rear motor vehicle comprising a vehicle body, a retractable roof system movable with respect to the vehicle body, and a rear section movable with respect to the vehicle body, the rear section and the vehicle body defining a storage area for the retractable roof section, the rear section defining the rear section of the vertical rear vehicle.

Vertical rear vehicles as defined herein include SUVs, minivans, hatchbacks and other trunkless vehicles where the rear window is at the end of the automobile.

Thus, with the present invention vertical rear automobiles may be outfitted with a retractable roof system.

Preferably, the motor vehicle has at least two rows of seats.

The retractable roof system preferably is a three-section retractable hard-top roof.

The rear section preferably includes two rear panels, one of which includes the rear window. The two rear panels preferably can move with respect to one another, for example by pivoting around an axis.

The rear section preferably has a common pivot axis coextensive with a rear bumper of the vehicle. A main pivot axis of the retractable roof system may be located behind the last row of seats.

The present invention also provides a method for retracting a convertible roof system on a vehicle comprising the steps of: moving a rear section to increase access to a storage area, the rear section defining the rear of the vehicle and including a rear window of the vehicle; retracting a top roof section into the storage area; and returning the rear section to partially cover the storage area.

Preferably, the top roof section includes three panels movable with respect to each other, and the rear section two panels movable with respect to each other.

The method may further include moving a first panel of the rear section having a rear vehicle window over the storage area.

The present invention also provides a method for retracting a convertible roof system on a vehicle comprising the steps of: moving a rear section of a vertical rear vehicle to increase access to a storage area, the rear section defining the rear of the vehicle; retracting a top roof section into the storage area; and returning the rear section to partially cover the storage area.

The present invention also provides a convertible top storage area cover comprising a movable first panel and a second panel movable with respect to the first panel, the second panel including a window, the second panel for covering the storage area.

The term "panel" as used herein is defined as a rigid section, for example including convertible hard top sections.

BRIEF DESCRIPTION OF THE DRAWINGS

The following figures shows a preferred embodiment of the present invention in which.

DETAILED DESCRIPTION OF A PREFERRED EMBODIMENT

Figure 1:
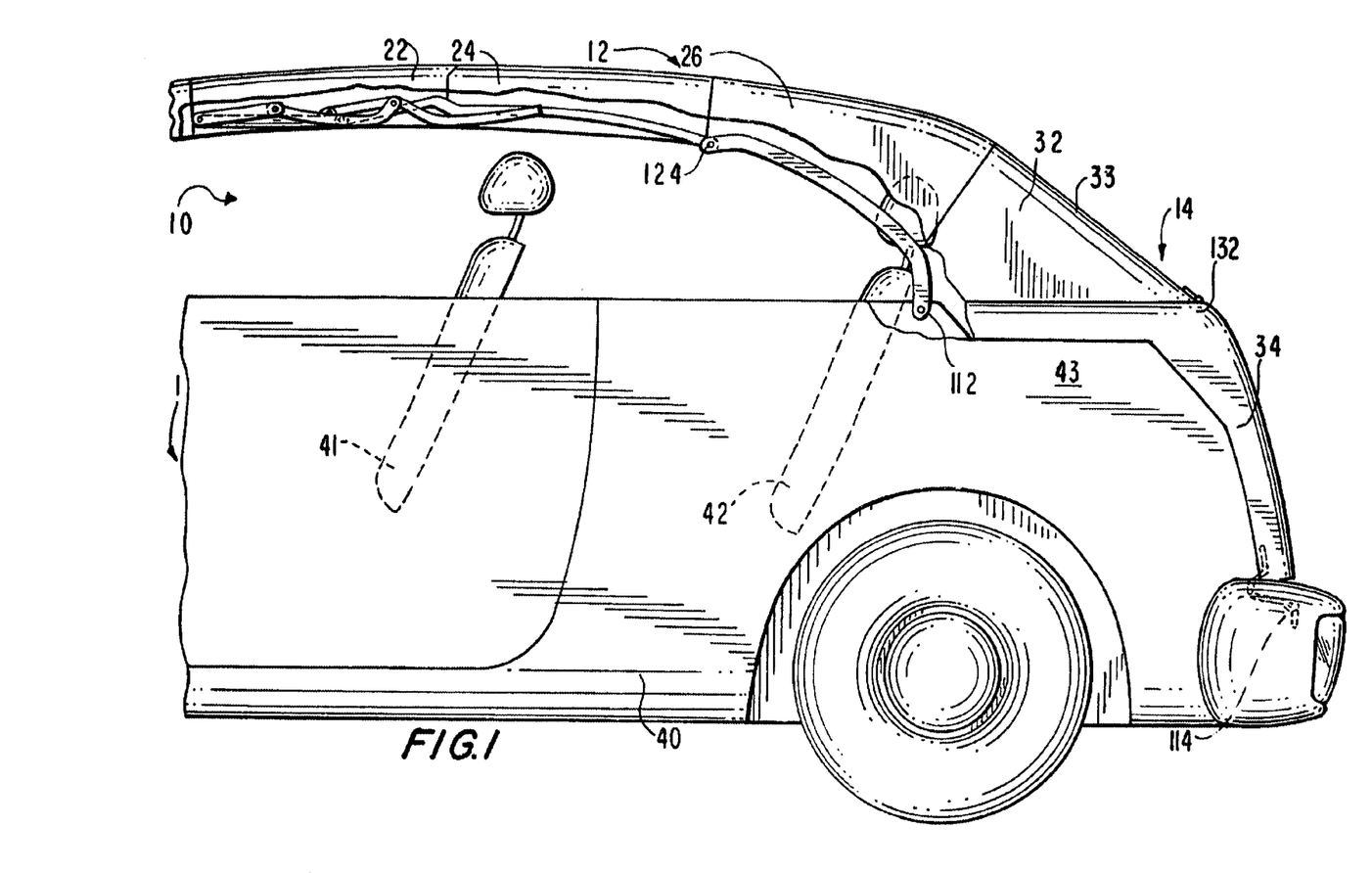
FIG. 1 shows a schematic side view of a preferred exemplary embodiment of a vertical rear vehicle with a convertible system according to the present invention in a deployed position.

FIG. 1 shows a schematic side view of a preferred exemplary embodiment of a vertical rear vehicle 1 with a convertible system 10 according to the present invention in a deployed position. Vehicle 1 also has two rows of seats 41, 42 and a frame 40.

Convertible system 10 has a roof section 12 and a rear section 14. Rear section 14 has a first panel 34 and a second panel 32. First panel 34 is pivotable with respect to frame 40 about an axis 114, for example using a hydraulic, pneumatic or electric drive. First panel 34 and frame 40 define a storage area 43 located behind rear seat row 42. Second panel 32 has a rear window 33 for the vehicle 1. Second panel 32 is pivotable with respect to first panel 34 about an axis 132, and also has a drive, for example a hydraulic, pneumatic or electric drive to effect this rotation. Both panels 32 and 34 may have latches to latch them in the shown position.

Roof section 12 has a front panel 22, a middle panel 24 and a rear panel 26, which can provide roof coverage for long vehicles, such as minivans. The roof section 12 may extend over two or more rows of seats 41, 42, and has a primary pivot fastened to the frame to permit the roof section to rotate about axis 112.

Figure 2:
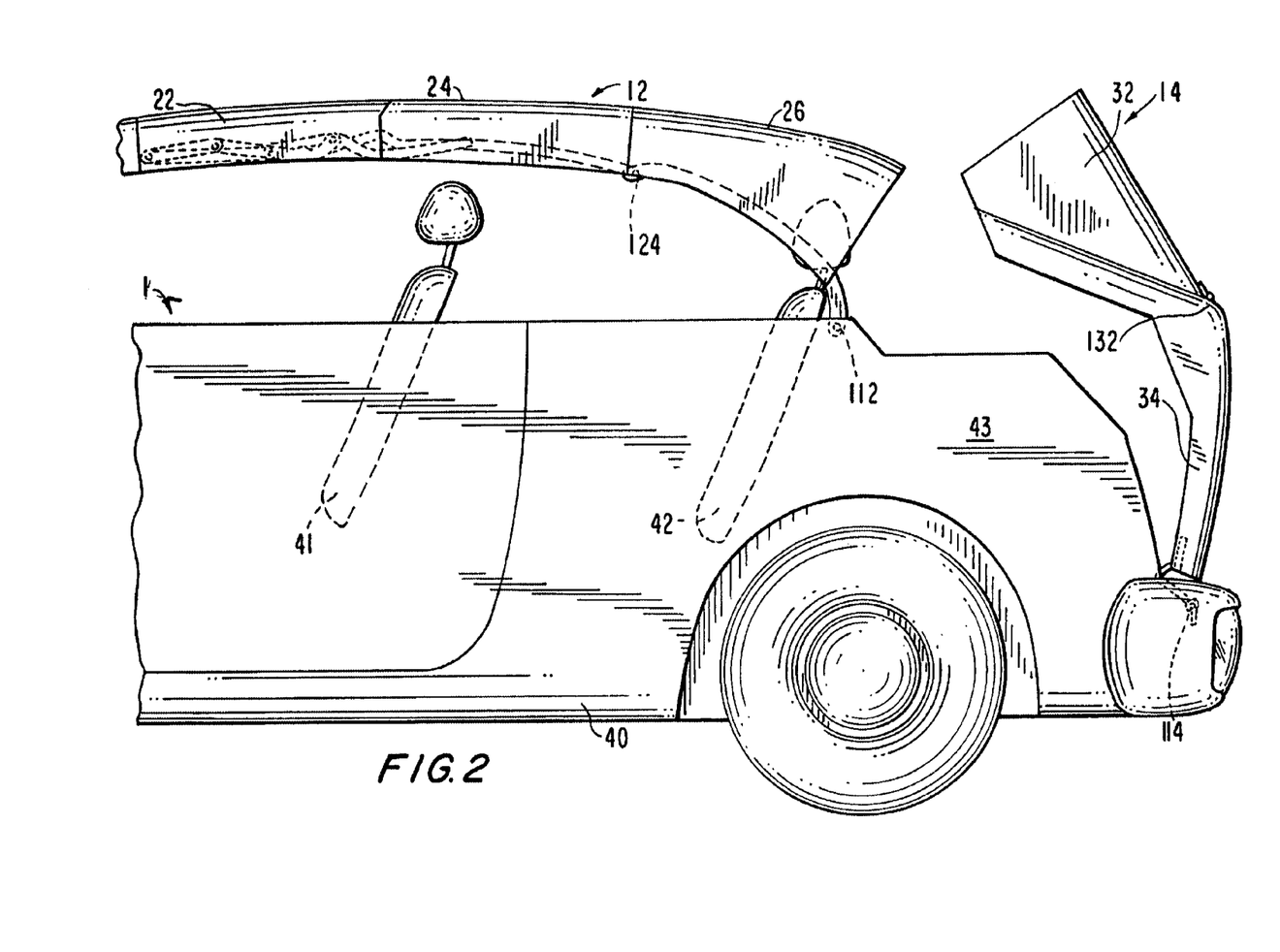
FIG. 2 shows the convertible top system from FIG. 1 in a first opening step.

FIG. 2 shows the convertible top system 10 from FIG. 1 in a first opening step, in which rear section 14 pivot rearwardly about axis 114. Both panels 32 and 34 move together, so that no rotation of panel 32 about axis 132 takes place. Storage area 43 is thus exposed, and rear section 14 no longer blocks movement of roof section 12, since panel 32 moves out of contact with rear panel 26.

Figure 3:
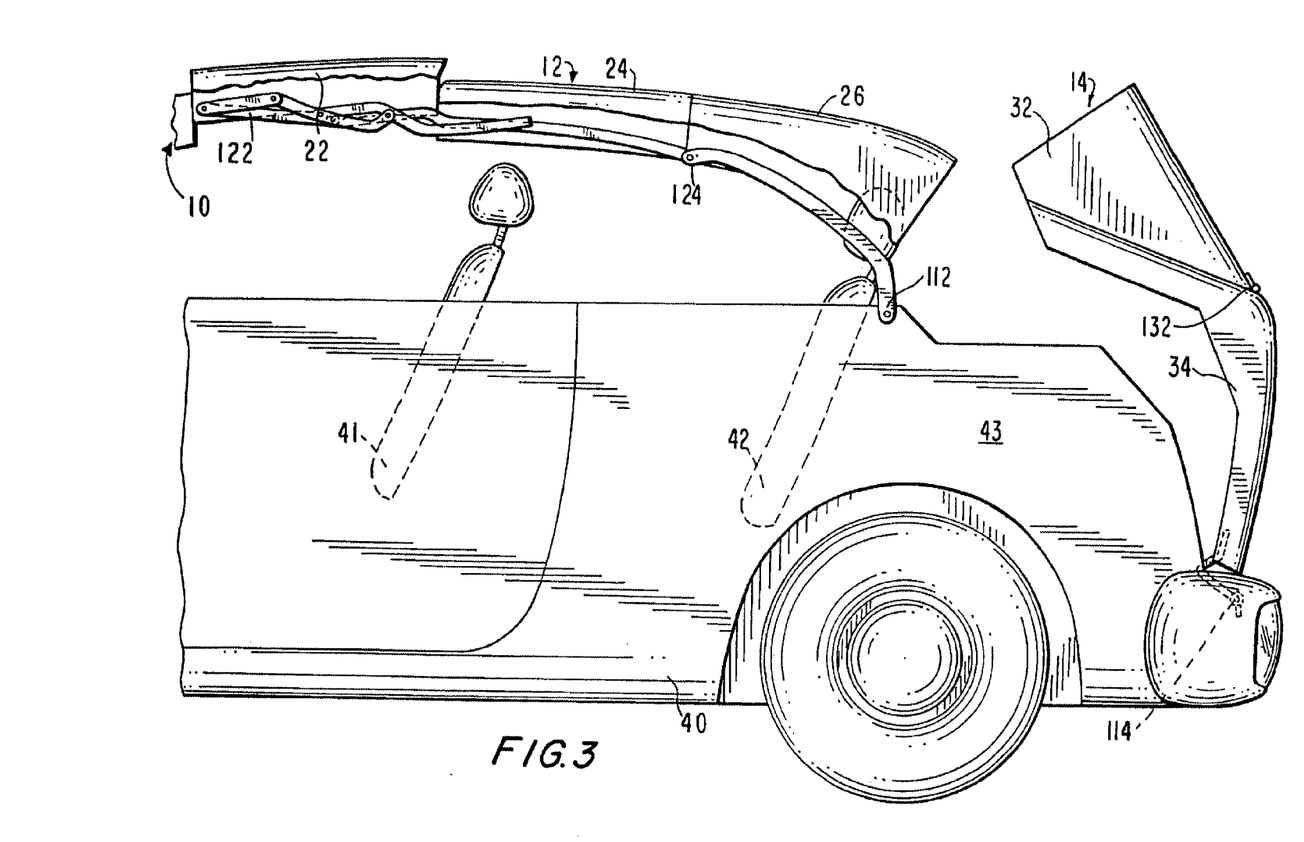
FIG. 3 shows the convertible top system from FIG. 2 in a second opening step.

FIG. 3 shows a first retraction step for the roof section 12, with the entire roof section rotating rearwardly around axis 112 and front section 22 moving upwardly via linkage 122 that connects front section 22 to middle section 24. Middle section 24 begins to separate to from rear section 26 about connection point 124.

Figure 4:
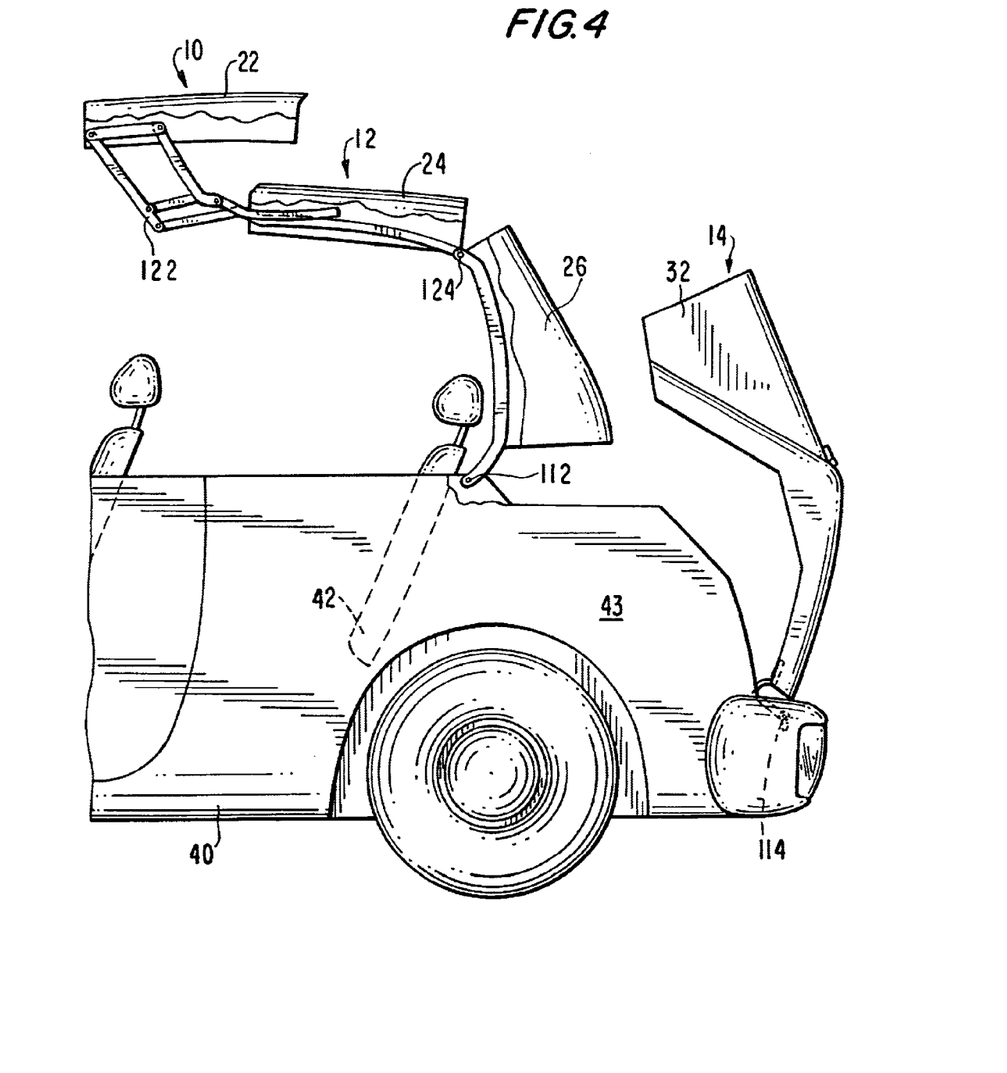
FIG. 4 shows the convertible top system from FIG. 3 further opening.

FIG. 4 shows the convertible top system 10 as shown in FIG. 3 further opening, with front panel 22 moving over middle panel 24 and rear panel 26 moving toward storage area 43, through the pivoting about axis 112.

Figure 5:
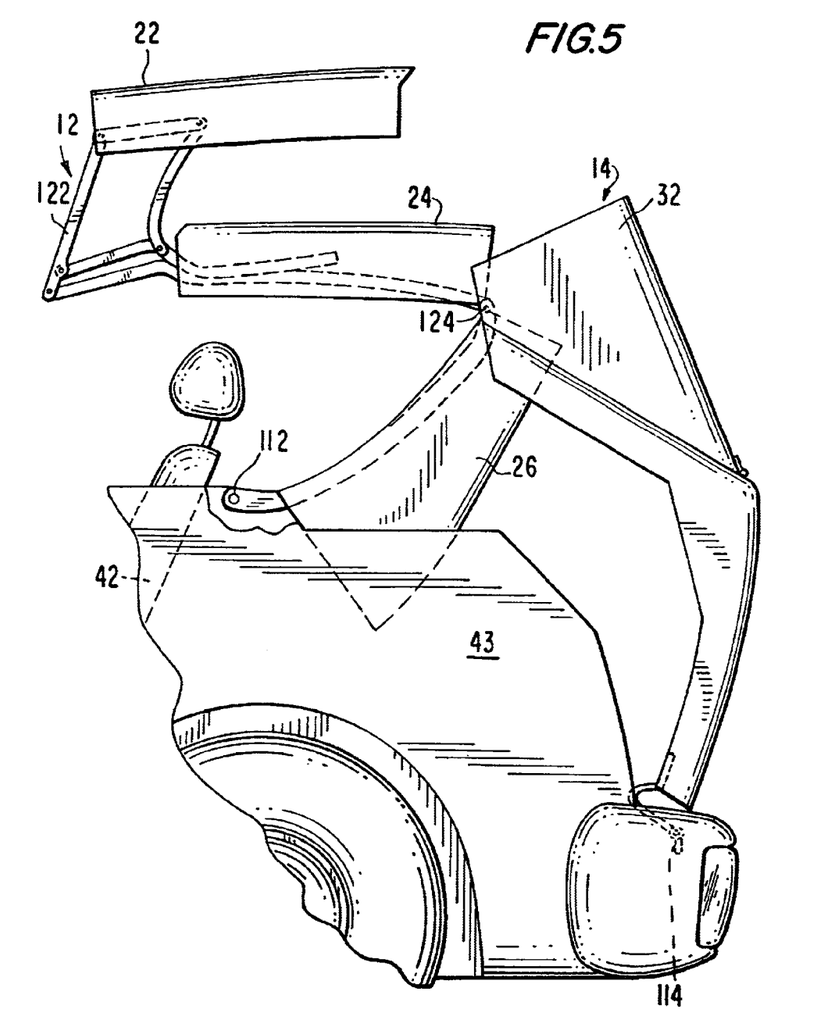
FIG. 5 shows the convertible top system from FIG. 4 with the roof section entering the storage area.

As shown in FIG. 5, the roof section 12 then begins to enter the storage area 43. Front panel 22 moves atop middle section 24 via the linkage 122. Rear panel 26 moves into the storage area via the rotation about axis 112, and can pass interiorly through panel 32, which is wider than the panel 26.

Figure 6:
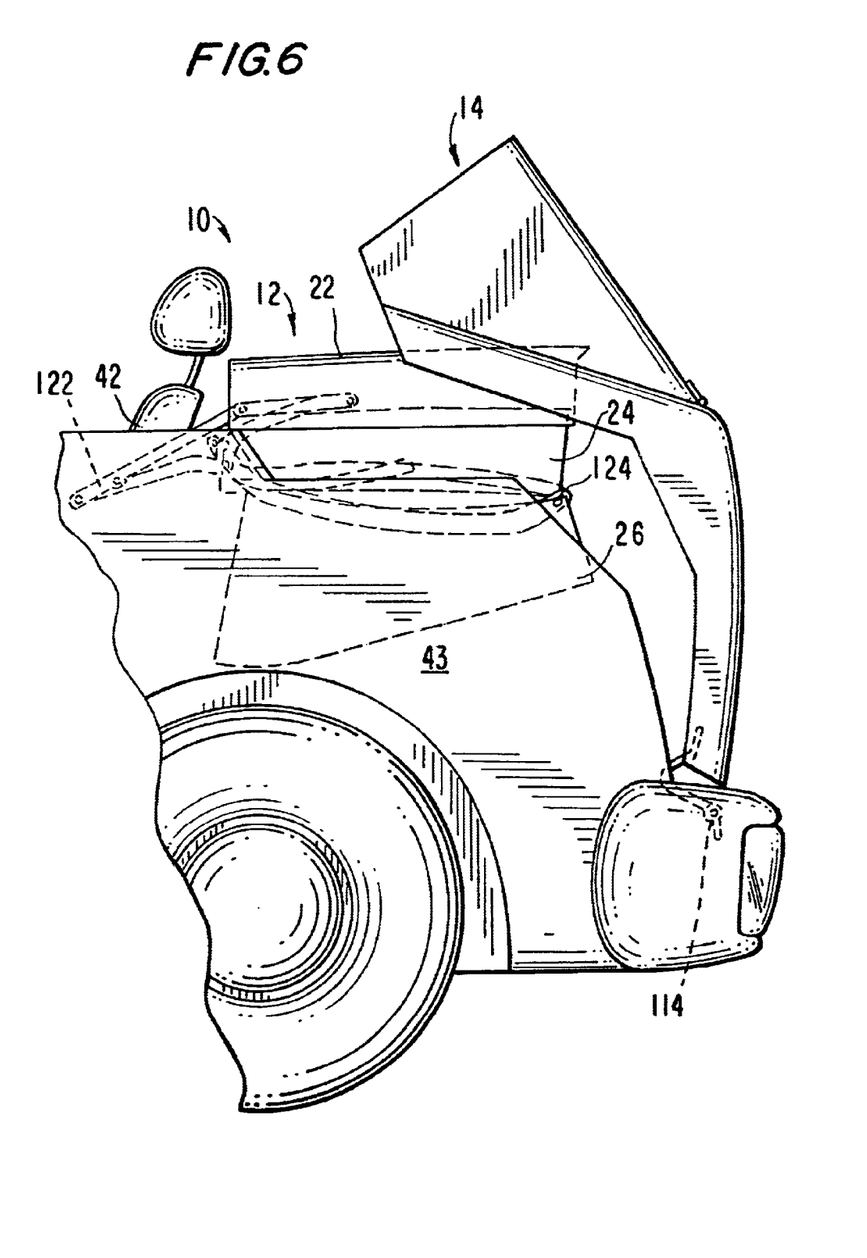
FIG. 6 shows the convertible top system from FIG. 5 with the roof section almost fully within the storage area.

FIG. 6 shows the convertible top system 10 from FIG. 5 with the roof section 12 almost fully within the storage area 43, the three panels 22, 24 and 26 of roof section 12 being located one over the other. Seat rows 41 and 42 are uncovered.

Figure 7:
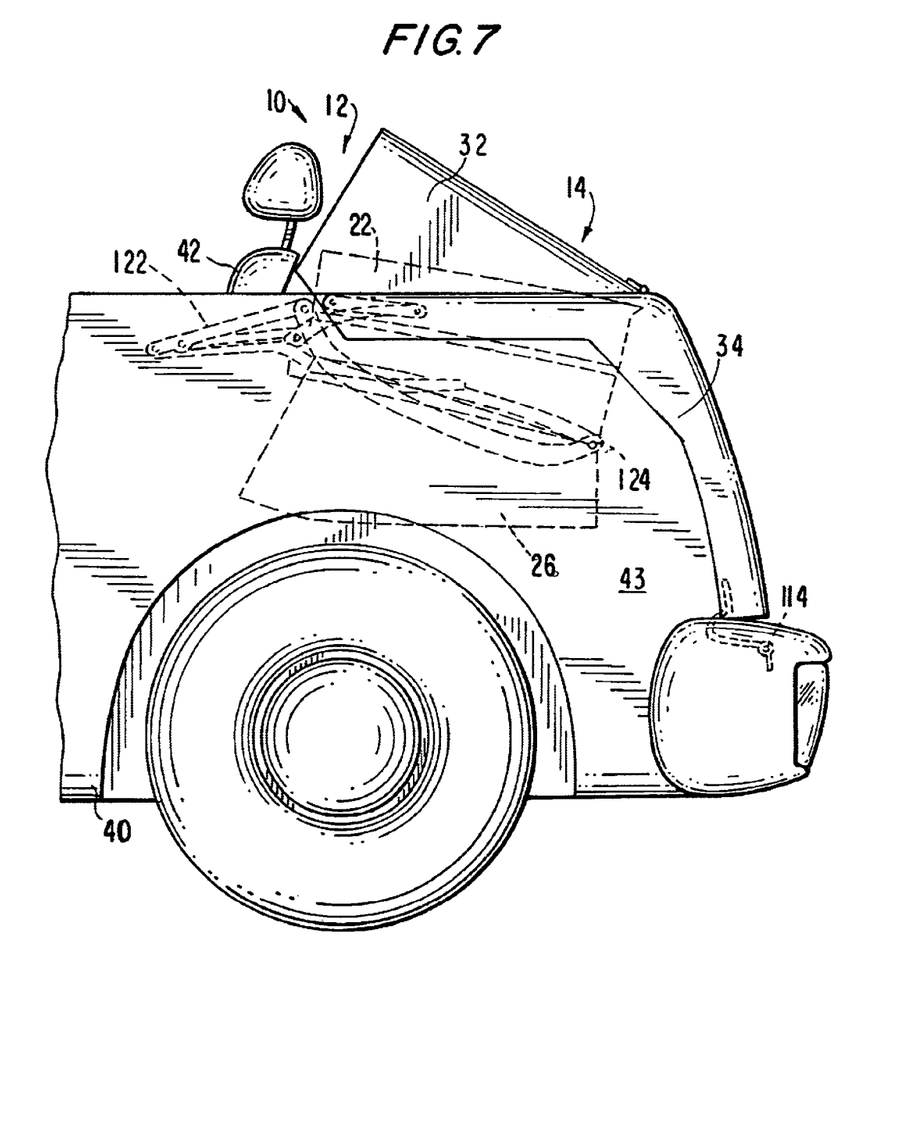
FIG. 7 shows the convertible top system of FIG. 6 with the roof section fully within the storage area and the rear section returned to a position similar to when the retractable roof is deployed.

FIG. 7 shows the convertible top system 10 of FIG. 6 with the roof section 12 fully within the storage area 43. Rear section 14 is returned about axis 114 to a position similar to when the retractable roof section 12 is deployed. The panel 34 at this point can be latched to the frame 40.

Figure 8:
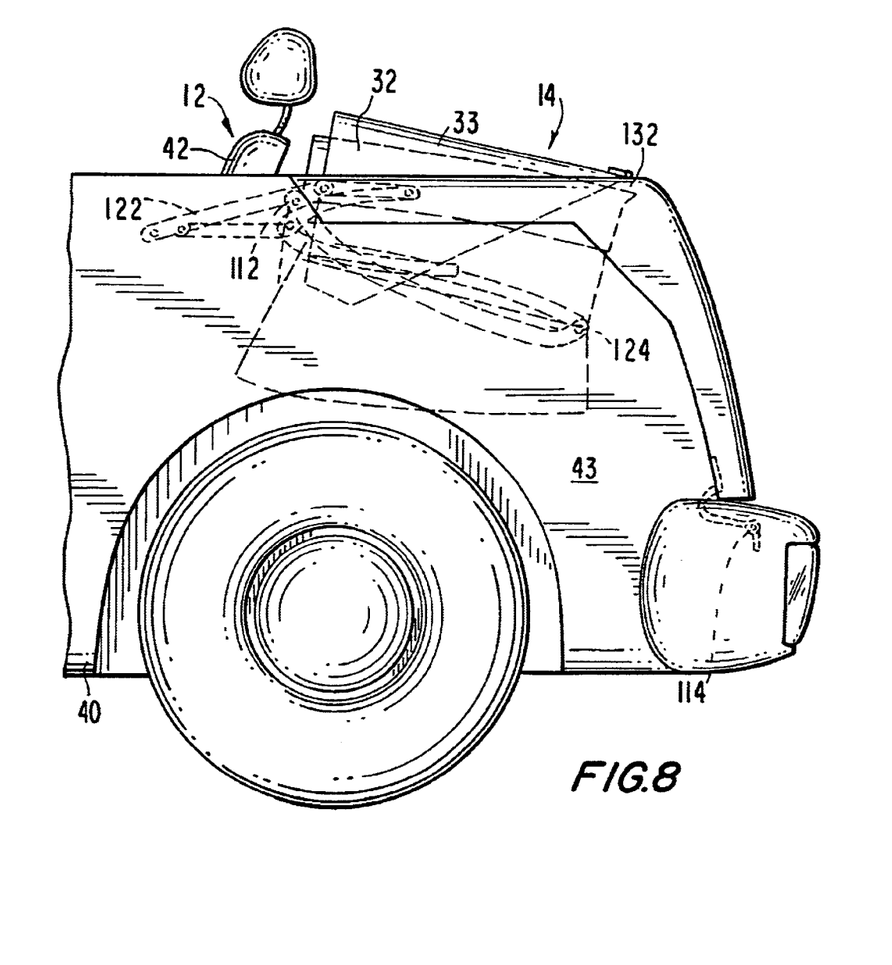
FIG. 8 shows the rear window panel of the rear section covering the storage area.

At this point, as shown in FIG. 8, the rear window panel 32 having rear window 33 can rotate about axis 132, so as to form a protective cover for stored roof section 12 and to reduce wind resistance during driving in an open position.

The linkage 122 and connection 124, as well as the entire support and drive mechanism for roof section 12, may be similar to that disclosed in the U.S. Ser. No. 09/746,743 application.

In order to re-deploy the roof section 12 over the seat rows 41, 42, the steps shown in FIGS. 1 through 8 are reversed.

What is claimed is:

1. A vehicle convertible system comprising:
    a roof section having a plurality of retractable panels; and
    a movable rear section separate from the roof section defining part of a storage area for the retractable panels, the rear section including a first rear panel and a second rear panel, with the second rear panel including a window, the second rear panel for covering the storage area.

2. The vehicle convertible system as recited in claim 1 wherein the rear section is pivotable about a first rotational axis.

3. The vehicle convertible system as recited in claim 1 wherein the second rear panel is movable with respect to the first rear panel.

4. The vehicle convertible system as recited in claim 3 wherein the second rear panel covers the storage area when the retractable panels are retracted.

5. The vehicle convertible system as recited in claim 3 wherein the second rear panel is pivotable with respect to the first rear panel about a second rotational axis.

6. The vehicle convertible system as recited in claim 1 wherein the plurality of retractable panels numbers three.

7. The vehicle convertible system as recited in claim 6 wherein the three retractable panels are stacked over each other in a retracted position.

8. The vehicle convertible system as recited in claim 1 wherein the roof section and rear section are driven automatically.

9. A vehicle convertible system comprising:
a roof section having a plurality of retractable panels; and
a movable rear section separate from the roof section defining part of a storage area for the retractable panels, the rear section includes a first rear panel and a second rear panel, the second rear panel being pivotable with respect to the first rear panel, the second rear panel for fully covering the storage area.

10. The vehicle convertible system as recited in claim 9 wherein the second rear panel fully covers the storage area when the retractable panels are retracted.

11. The vehicle convertible system as recited in claim 9 wherein the plurality of retractable panels numbers three.

12. The vehicle convertible system as recited in claim 11 wherein the three retractable panels are stacked over each other in a retracted position.

13. The vehicle convertible system as recited in claim 9 wherein the roof section and rear section are driven automatically.

14. A convertible vertical rear motor vehicle comprising:
a vehicle body;
a retractable roof system movable with respect to the vehicle body; and
a rear section movable with respect to the vehicle body, the rear section and the vehicle body defining a storage area for the retractable roof section, the rear section defining a rear of the vertical rear vehicle, wherein the rear section includes a first rear panel and a second rear panel movable with respect to the first rear panel, the second rear panel for fully covering the storage area.

15. The convertible vertical rear motor vehicle as recited in claim 14 further comprising at least two rows of seats attached to the vehicle body.

16. The convertible vertical rear motor vehicle as recited in claim 14 wherein the retractable roof system includes three panels.

17. The convertible vertical rear motor vehicle as recited in claim 14 wherein the second rear panel includes a rear window.

18. The convertible vertical rear motor vehicle as recited in claim 14 wherein the rear section has a common pivot axis coextensive with a rear bumper of the vehicle.

19. The convertible vertical rear motor vehicle as recited in claim 15 wherein a main pivot axis of the retractable roof system is located behind a last row of the at least two rows of seats.

20. A method for retracting a convertible roof system on a vehicle comprising the steps of:
moving a rear section to increase access to a storage area, the rear section defining the rear of the vehicle and including a first panel and a second panel moveable with respect to the first panel and a rear window of the vehicle;
retracting a top roof section into the storage area; and
returning the rear section to cover the storage area.

21. The method as recited in claim 20 wherein the top roof section includes three panels movable with respect to each other.

22. The method as recited in claim 20 wherein the second panel includes the rear window.

23. A method for retracting a convertible roof system on a vertical rear vehicle comprising the steps of:
moving a rear section of a vertical rear vehicle to increase access to a storage area, the rear section defining the rear of the vehicle;
retracting a top roof section into the storage area; and
returning the rear section to fully cover the storage area.

24. A convertible top storage area cover comprising:
a movable first panel; and
a second panel movable with respect to the first panel, the second panel including a window, the second panel for covering the storage area.

* * * * *